April 2, 1963 P. M. BUHLER 3,084,230

SYSTEM FOR TESTING TELEPHONE LINES

Filed May 10, 1957

INVENTOR.
PETER M. BUHLER
BY
Paul A. Weilein
ATTORNEY.

United States Patent Office 3,084,230
Patented Apr. 2, 1963

3,084,230

SYSTEM FOR TESTING TELEPHONE LINES

Peter M. Buhler, 4375 Shirley Ave., El Monte, Calif.

Filed May 10, 1957, Ser. No. 658,418
12 Claims. (Cl. 179—175)

The present invention generally relates to testing telephone lines, and more particularly to testing telephone lines to determine whether such lines are in service during line operations requiring line identification, such as when adding or deleting subscriber service lines and the like.

Heretofore, when a telephone lineman was faced with the problem of identifying a specific pair of wires constituting positive and negative sides of a talking circuit, he tapped on to a selected pair with a headset to ascertain whether the pair was in use. If there was a lull in conversation, the lineman naturally detected no sounds, and in addition, even though conversation might be taking place, outside noises could result in the lineman's being unable to hear the conversation. In any event, failing to hear any conversation, the lineman imposed an audible signal on the circuit for the purpose of identifying the cable pair at their point of origin. Naturally, if the lines were in service, the user was subjected to an annoying sound, thus resulting in numerous complaints from subscribers over a period of time.

Moreover, upon so identifying a circuit, it was frequently the case that the circuit would be temporarily broken or interrupted to enable splicing in or removing service lines. Thus, if the lineman did not detect conversation, even though the circuit was in use, service would be interrupted and the subscriber cut off in his converstaion.

Accordingly, there has long been a need in the telephone industry for a simple method and apparatus or device whereby it can be readily determined with accuracy whether a selected telephone circuit is in use, without relying on tapping the circuit to listen to any conversation, thus enabling circuit or line identification without disturbing a subscriber.

An object of the present invention therefore is to provide a method and a simple, easily manufactured and inexpensive device which enables telephone line testing and identification without interruption of service of a circuit which is in use.

In its broad aspects, the invention contemplates a method whereby a selected line or circuit may be tapped, and the use or non-use of the circuit may be indicated on a voltmeter or similar device without relying upon listening to conversation taking place on the circuit, and then if the circuit is not in use, imposing an audible signal thereon for the purpose of identifying the circuit in the usual manner.

Another object is to provide a novel device for accomplishing the above referred to method, and including a line tap, a voltmeter or other device connected with said tap so that upon connection of the tap with a circuit which is in use the voltmeter or other device will so indicate, and if the circuit is idle the voltmeter will indicate this condition, and a tone producing device such as an oscillator selectively connectable in the circuit between the tap and the voltmeter, when the voltmeter indicates the telephone circuit to be idle, thus enabling identification of the circuit without interruption of service or other annoyance to a subscriber.

Another object is to provide a device in accordance with the foregoing including a combined line tap and switch, a voltmeter or other device responsive to variations in electrical potential in a circuit to be tapped, said voltmeter or other device being operatively connected to said tap, and a self-contained tone producing device controlled by said switch for selectively imposing a tone on said circuit upon closing the switch, when the circuit is not in use as indicated by the voltmeter or other electrical potential responsive device.

A further object is to provide a novel combined tap and switch having clamp means for tapping onto a telephone line and a switch for controlling the connection of a tone producing device to the tapped line through the tap.

Other objects and advantages of the invention will be hereinafter described, or will become apparent to those skilled in the art to which the invention appertains, and the novel features thereof will be defined in the appended claims.

In the accompanying drawing.

Like reference characters in the several views of the drawing and in the following description designate corresponding parts.

Figure 1:
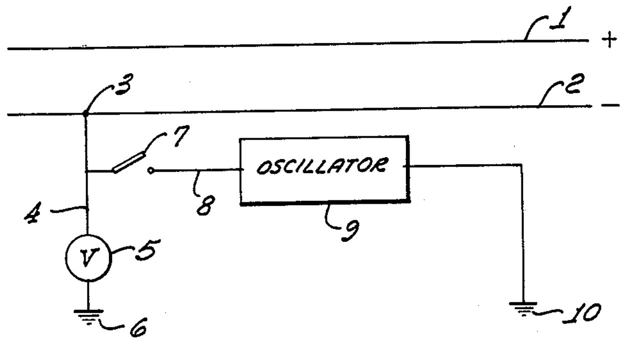
FIG. 1 is a diagrammatic view of a telephone line testing and tone producing circuit in accordance with the invention.

Referring first to FIG. 1, the invention is shown diagrammatically as applied to a telephone circuit having a positive line 1 and a negative line 2. Connected or tapped to the line 2 at 3 is a line 4 leading to a voltmeter 5 or other conventional device which will respond to electrical potential in the circuit 1, 2 and give an indication of whether the circuit is in use or idle. The voltmeter is grounded as at 6.

In the line 4, between the voltmeter 5 and the tap 3, is a switch 7 adapted to selectively connect a line 8 to the circuit 1, 2 through the tap 3. The line 8 is connected with a conventional tone producing device 9 which is grounded at 10.

This tone producing device 9 is preferably of the type including a vacuum tube oscillator capable of producing a tone having a frequency of about 500 cycles with a 7 cycle warble, this tone having been found to be advantageous in the testing of telephone lines. The details of the tone producing device are not material to the present invention and therefor will not be specifically described herein, but reference may be made to Section G86.060.9, Issue 1, January 1949, A.T.&T. Co. Standard of the manual of Bell System Practices, of the American Telephone and Telegraph Company, wherein such details are specifically shown and described.

The tone producing device is self-contained, in that it requires no outside source of current but has its own batteries. However, as long as switch 7 is open, as shown in FIG. 1, no tone will be imposed on the circuit lines 1, 2. Thus, when the tap 3 is applied to the circuit 1, 2 and the voltage reading indicates the circuit is in service, the switch 3 is left open. When the voltmeter indicates that the circuit is not in use or that the circuit is a spare if no voltage reading is effected, then the switch 7 may be closed to closed to impose a tone on the circuit 1, 2 and the normal procedures of testing, identifying, splicing, or crossing over the lines may be effected. In this manner there is no possibility of interrupting service to a subscriber while the circuit 1, 2 is in use or subjecting the subscriber to the tone produced by the device 9.

Figure 2:
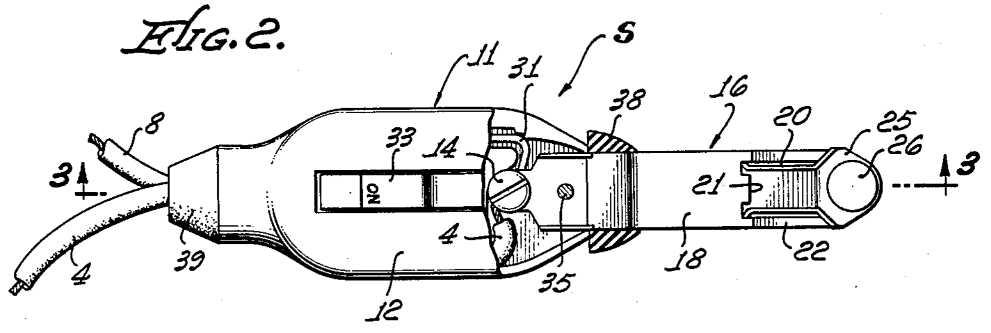
FIG. 2 is a top plan view of a combined switch and tap in accordance with the invention, with a portion of the switch housing broken away to show the connection of the tap clamp to the switch pole.
Figure 3:
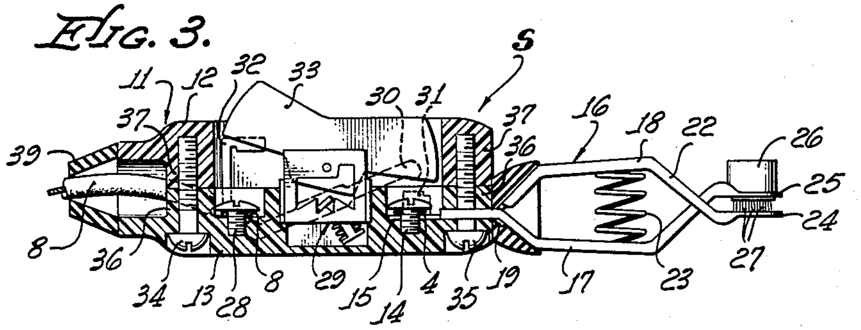
FIG. 3 is a view in vertical section, as taken on the line 3—3 of FIG. 2.

Referring to FIGS. 2 and 3, a combined switch and tap on clamp, generally designated S, is shown. This switch and clamp is particularly adapted for use in the performance of the method hereof and includes a two part housing 11 having upper and lower housing sections 12 and 13 respectively.

Interiorly of one end of the housing is a terminal screw 14 adapted to secure in place the end of line 4 of FIG. 1. In addition the screw 14 passes through an end tab 15 of a tap-on clamp 16. The clamp 16 includes a base 17, on which the tab 15 is integrally formed, and a top member 18, which is pivotally mounted on the base 17 as at 19. The base 17 has a tongue 20 which projects through a slot 21 in an angularly disposed section 22 of the top member 18 so that the bottom and top clamp members 17 and 18 cross one another. A spring 23 of the coiled compression type is disposed between the bottom and top clamp members 17 and 18 and normally urges the members apart. On the outer extremities of the clamp members 17 and 18 are clamping ears 24 and 25 respectively, which are normally urged towards one another by the spring 23.

As seen in FIG. 3, the ear 24 has an insert 26 thereon, this insert being provided with a plurality of wire engaging teeth or spines 27 adapted to pierce the insulation on a wire to effect good electrical connection of the clamp to the wire.

Thus, when the clamp is applied to a wire of a telephone circuit pair, the spines 27 will effect contact, and the voltmeter 5 will be in circuit with the wire through the clamp 16, the screw 14 and the line 4.

At the other end of the switch housing 11 is a terminal screw 28 which is adapted to secure in place the bared end of line 8 leading to the tone producing device 9. In addition, a toggle type switch mechanism 29 including a contact arm 30 is disposed in the upper switch housing section 12. The toggle means shifts the arm 30 into and out of engagement with contacts 31 and 32 which are respectively connected to the screws 14 and 28, thus selectively effecting connection of the clamp with the tone producing device 9 when the switch is closed. A pivotally mounted switch operator 33 is carried by the upper housing 12 for actuating the toggle mechanism.

It will be noted that the switch housing sections 12 and 13 are secured together by a pair of screws 34 and 35, which extend upwardly through the bottom housing 13 and into the upper housing 12, the housing parts having generally cylindrical bosses 36 and 37 respectively, for accommodating the screws. Where the tab 15 of the clamp 16 projects into the housing, the boss 36 is relieved to accommodate the tab 15, and the screw 35 also extends through the tab 15. Thus, the clamp is securely held in place, not only by screw 14 but also by screw 35, thereby assuring a strong connection.

If desired, a rubber or other flexible boot or shield 38 may be employed as a dust guard about the clamp 16 where it enters the housing 11. Another dust guard 39 may be employed at the other end of the housing 11 to sealingly embrace the wires 4 and 8 which both preferably pass out of the housing at the opposite end thereof from the clamp 16.

In view of the foregoing it will be seen that a simple yet improved method and device has been provided for use by telephone linemen to facilitate their work, without annoyance or inconvenience of the subscriber. In addition, a novel combined switch and tap-on clamp has been provided for such method and device.

While the specific details of the invention have been herein shown and described, changes and alterations may be resorted to, without departing from the spirit thereof as defined in the appended claims.

I claim:

1. A system for testing telephone lines in the field including a portable unit comprising: means for tapping at a point remote from a station test board, a telephone line that has not been identified; visual indicating means responsive to changes of electrical potential in said line to indicate whether said line is in service; said indicating means being in circuit with said tapping means; electrical signal producing means; and means for connecting said signal producing means to said line through said tapping means.

2. A system for testing telephone lines in the field including a portable unit comprising: means for tapping an unidentified telephone line at a point remote from a station test board; a voltmeter in circuit with said tapping means; electrical signal producing means; and means for connecting said signal producing means to said line through said tapping means.

3. A system for testing telephone lines, including: means for tapping a line; visual indicating means responsive to changes in electrical potential in said line to determine whether said line is in service; said indicating means being in circuit with said tapping means; electrical signal producing oscillator means; and means for connecting said signal producing means to said line through said tapping means.

4. A system for testing telephone lines, including: means for tapping a line; a voltmeter in circuit with said tapping means; electrical signal producing oscillator means; and switch means for connecting said signal producing means to said line through said tapping means.

5. A system for testing telephone lines in the field including a portable unit comprising: means for tapping at a point remote from a station test board, a telephone line that has not been identified as yet at a test board; said line tapping means including a switch; visual indicating means responsive to changes in electrical potential on said line; said indicating means being in circuit with said line tapping means; and electrical signal producing means operatively connected to said switch for imposing a signal on said line when the switch is closed.

6. A system as defined in claim 5, wherein said tapping means includes a wire clamp, said switch having a contact operatively connected to said clamp.

7. A system as defined in claim 5, wherein said tapping means includes a wire clamp; said switch having a contact operatively connected to said clamp; said switch including a screw contact to which said indicating means is operatively connected; said clamp having a tab; and said screw extending through said tab for interconnecting said switch contact, said clamp and said indicating means.

8. A device of the class described, including: a switch housing; switch means in said housing including a screw contact for securing an electrical lead in said housing; and clamping means including a tab extending into said housing; said screw extending through said tab to retain the clamp and switch in assembled relation.

9. A device of the class described, including; a switch housing composed of a pair of abutting sections; switch means in said housing; a contact for an electrical lead; clamping means including a tab extending into said housing and engaged with said contact; and means securing said housing sections together including a fastener extending through said tab to retain the clamp in assembled relation with said switch.

10. A device of the class described, comprising: a switch having a pair of terminals; means for selectively effecting electrical connection between said terminals; a wire tap clamp connected with one of said terminals; an electrical signal producing device connected with the other of said terminals; and a voltmeter also connected with the first-mentioned terminal.

11. A system for field testing telephone lines having a pair of conductors wherein one of the conductors of said pair will show full voltage to ground when said line is not in service and will show lower voltage to ground when said line is in service, and the other conductor of said pair will show no voltage when said line is not in service and a higher voltage when said line is in service, comprising means for indicating the voltage between ground and a point of connection to one of said conductors, means for connecting said indicating means to said latter conductor at said point, electrical signal producing means, and means for connecting said signal producing means to one of said conductors.

12. A system for field testing telephone lines having a pair of conductors wherein one of the conductors of said pair will show full voltage to ground when said line is not in service and will show lower voltage to ground when said line is in service, and the other condutcor of said pair will show no voltage when said line is not in service and a higher voltage when said line is in service, comprising means for indicating the voltage between ground and a point of connection to one of said conductors, means for connecting said indicating means to said latter conductor at said point, electrical signal producing means, and means for selectively connecting said signal producing means to said latter conductor through said means for connecting said indicating means thereto.

References Cited in the file of this patent

UNITED STATES PATENTS

| | | |
|---|---|---|
| 1,576,723 | Crocker | Mar. 16, 1926 |
| 1,707,051 | Colosoff | Mar. 26, 1929 |
| 1,868,960 | Anderson | July 26, 1934 |
| 2,133,384 | Fisher et al. | Oct. 18, 1938 |
| 2,799,739 | Lowman et al. | July 16, 1957 |
| 2,806,203 | Church | Sept. 10, 1957 |